(12) United States Patent
Pile et al.

(10) Patent No.: US 11,919,678 B1
(45) Date of Patent: Mar. 5, 2024

(54) ABSORBENT STORAGE BAG LINER

(71) Applicants: Keia T. Pile, Grapevine, TX (US); Willie Pile, Grapevine, TX (US)

(72) Inventors: Keia T. Pile, Grapevine, TX (US); Willie Pile, Grapevine, TX (US)

( * ) Notice: Subject to any disclaimer, the term of this patent is extended or adjusted under 35 U.S.C. 154(b) by 258 days.

(21) Appl. No.: 17/343,472

(22) Filed: Jun. 9, 2021

Related U.S. Application Data

(60) Provisional application No. 63/036,555, filed on Jun. 9, 2020.

(51) Int. Cl.
| | |
|---|---|
| *B32B 3/10* | (2006.01) |
| *A45C 3/06* | (2006.01) |
| *B32B 5/02* | (2006.01) |
| *B32B 27/10* | (2006.01) |
| *B32B 29/02* | (2006.01) |
| *B65D 25/16* | (2006.01) |

(52) U.S. Cl.
CPC .............. *B65D 25/16* (2013.01); *A45C 3/06* (2013.01); *B32B 5/022* (2013.01); *B32B 27/10* (2013.01); *B32B 29/02* (2013.01); *B32B 2260/028* (2013.01); *B32B 2260/046* (2013.01); *B32B 2307/7145* (2013.01); *B32B 2307/7265* (2013.01); *B32B 2307/758* (2013.01); *B32B 2439/02* (2013.01); *B32B 2439/06* (2013.01); *B32B 2553/00* (2013.01)

(58) Field of Classification Search
None
See application file for complete search history.

(56) References Cited

U.S. PATENT DOCUMENTS

2009/0099539 A1 * 4/2009 Periman .............. A61F 13/4755
604/378

FOREIGN PATENT DOCUMENTS

| WO | WO-9826808 A2 * | 6/1998 | ............ A61F 13/42 |
| WO | WO-0078369 A1 * | 12/2000 | ........... A61F 13/531 |

* cited by examiner

*Primary Examiner* — Christopher M Polley
(74) *Attorney, Agent, or Firm* — Kenneth L. Tolar

(57) ABSTRACT

An absorbent liner for a handbag or similar storage bag includes a liquid-impermeable base layer having a plurality of foldable peripheral edges that can be formed into peripheral retaining walls. The bottom surface of the base layer is coated with a repositionable adhesive for detachably securing the liner to the bottom surface of the bag. Positioned atop the base layer is a superabsorbent core for collecting and containing spilled fluids. Resting on the absorbent layer is a wicking layer and a top layer that rapidly divert fluids to the absorbent core.

12 Claims, 7 Drawing Sheets

ABSORBENT STORAGE BAG LINER

CROSS REFERENCE TO RELATED APPLICATIONS

This application claims priority of provisional application No. 63/036,555 filed on Jun. 9, 2020, the specification of which is incorporated herein by reference.

BACKGROUND OF THE INVENTION

The present invention relates to a protective liner for handbags and similar containers that absorbs spilled fluids.

DESCRIPTION OF THE PRIOR ART

Purses, handbags, backpacks, and similar containers allow a user to conveniently and discreetly transport a myriad of personal items, such as nail polish, perfumes, and beverages. However, many personal items contain liquids that can inadvertently spill onto the bag interior. Moreover, other personal items, such as gum, ink pens and similar gelatinous materials can liquefy in higher temperatures and spill onto the surrounding area. Spilled liquid not only damages stored contents but can also irreparably ruin an expensive purse if the spilled liquid cannot be adequately cleaned. Furthermore, many people purchase higher quality purses to use for only one season, hoping to resell them thereafter. However, a liquid-damaged purse may have little or no resale value.

Accordingly, there is currently a need for a device that protects a purse or other bag from inadvertent liquid spillage. The present invention satisfies this need by providing a multilayer, absorbent liner that is securable to the lower surface of a desired bag to absorb errant fluid spills.

SUMMARY OF THE INVENTION

The present invention relates to an absorbent liner for a handbag or similar storage bag comprising a liquid-impermeable base layer having a plurality of foldable peripheral edges that can be formed into peripheral retaining walls. The bottom surface of the base layer is coated with a repositionable adhesive for detachably securing the liner to the bottom surface of the bag. Positioned atop the base layer is a superabsorbent core for collecting and containing spilled fluids. Resting on the absorbent layer is a wicking layer and a top layer that rapidly divert fluids to the absorbent core.

It is therefore an object of the present invention to provide a liner for a storage bag that absorbs spilled liquids.

It is therefore another object of the present invention to provide an absorbent liner for a storage bag that is quickly and easily securable to a bag interior.

It is yet another object of the present invention to provide an absorbent liner for a storage bag including outer layers that direct liquid to a central absorbent core.

Other objects, features, and advantages of the present invention will become readily apparent from the following detailed description of the preferred embodiment when considered with the attached drawings and the appended claims.

DESCRIPTION OF THE PREFERRED EMBODIMENT

Figure 1:
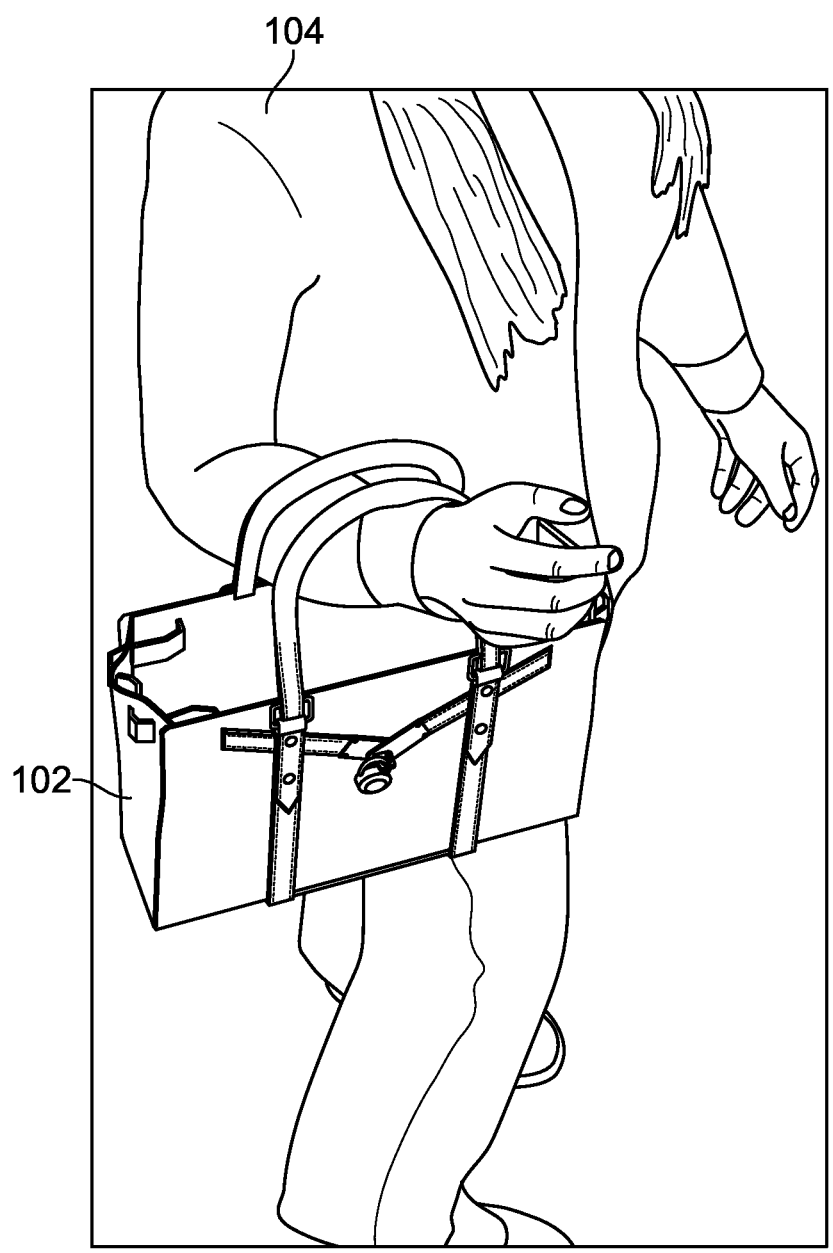
FIG. 1 depicts a bag containing the liner according to the present invention being held by a user.
Figure 2:
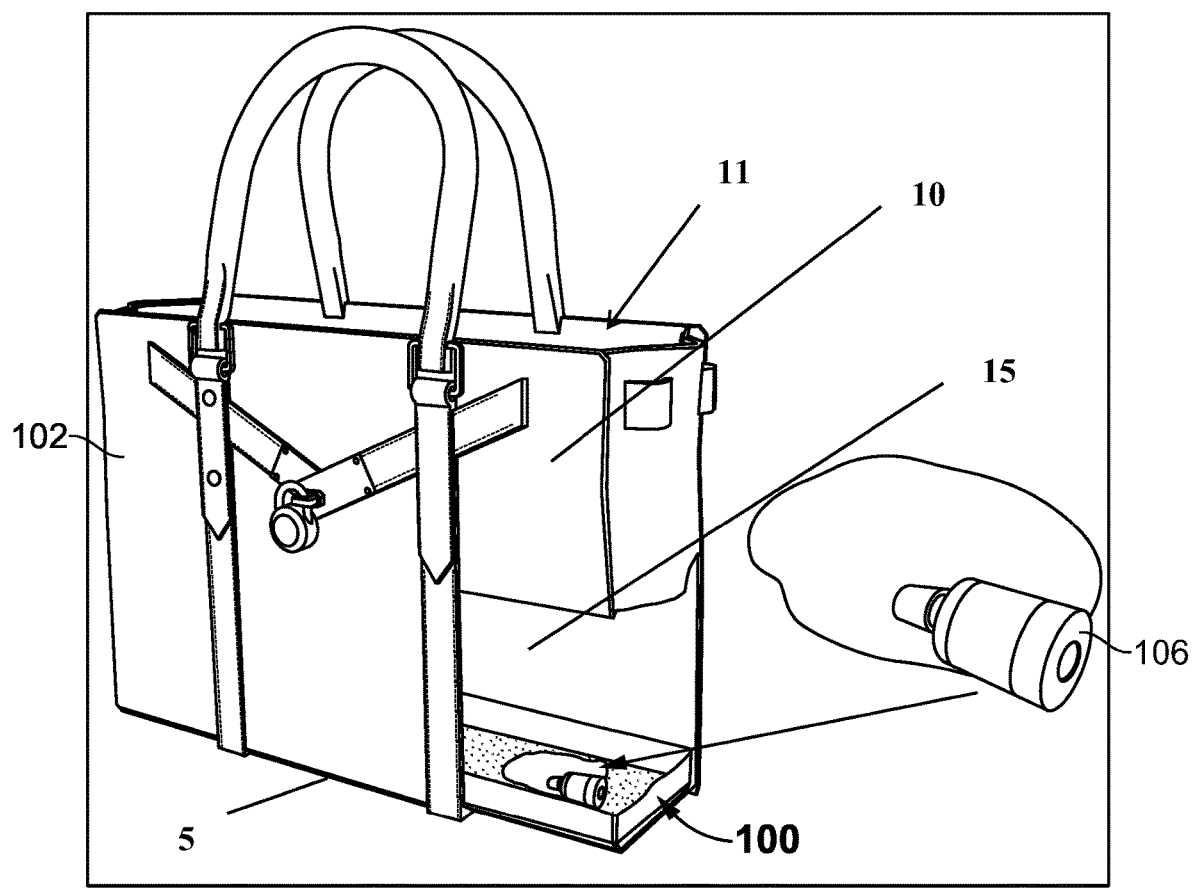
FIG. 2 depicts the liner absorbing spilled fluid.
Figure 3:
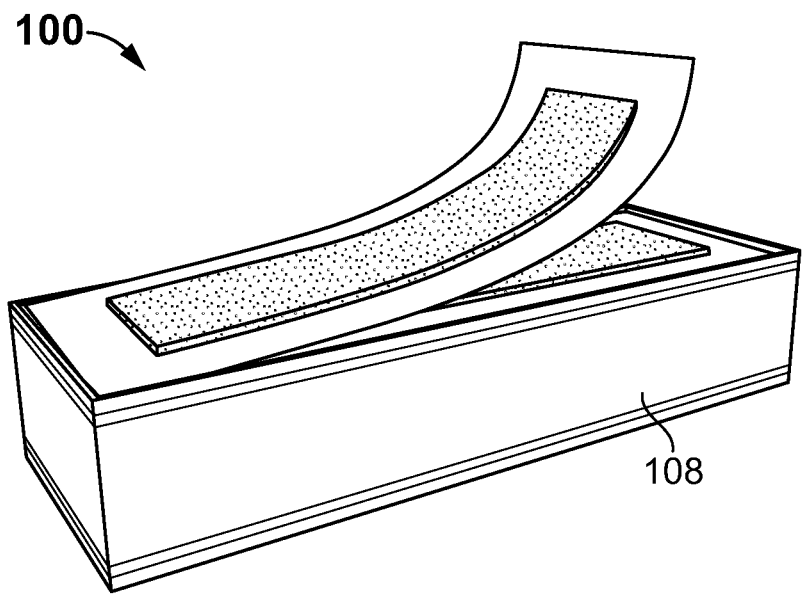
FIG. 3 depicts multiple liners packaged within a container.
Figure 5:
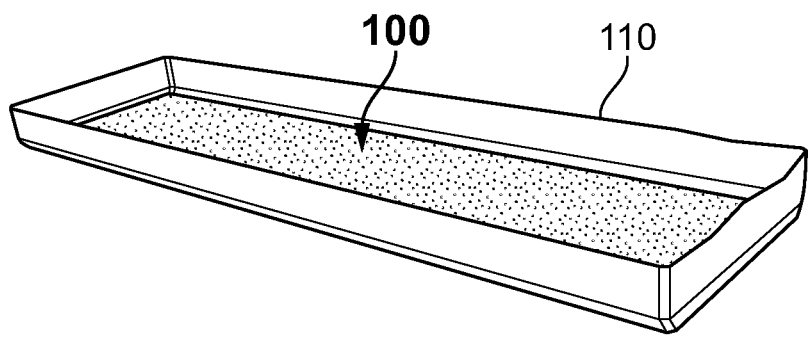
FIG. 5 depicts the base layer with the peripheral edges folded to form upstanding sidewalls.
Figure 6:
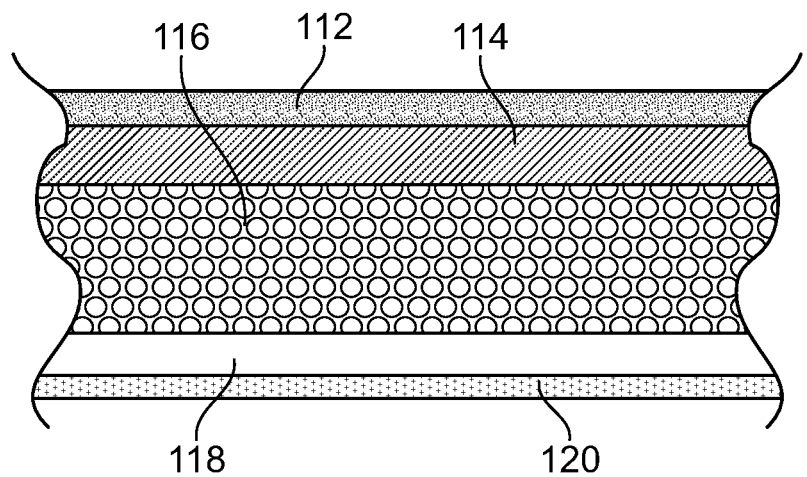
FIG. 6 is a cross-sectional view of the liner.
Figure 7:
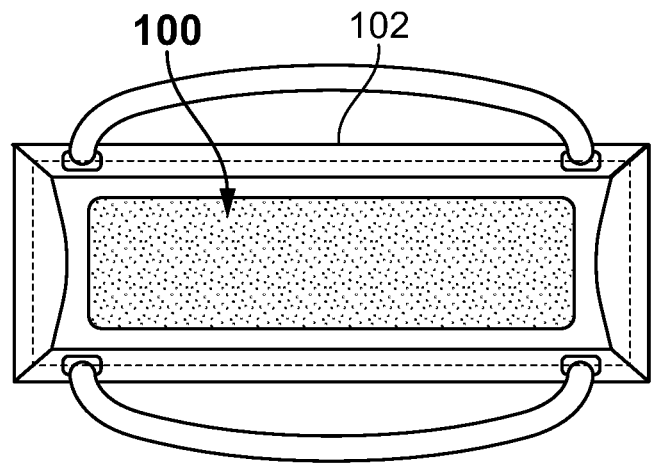
FIG. 7 is a top view of a bag with the liner according to the present invention positioned therein.
Figure 8:
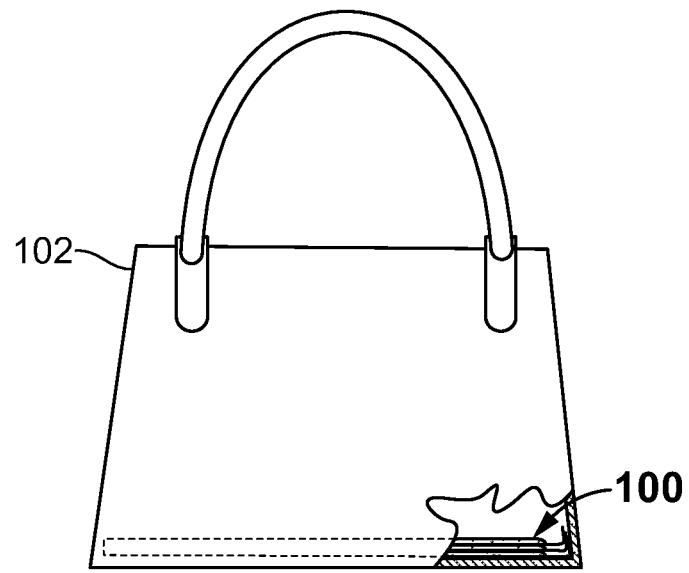
FIG. 8 is a plan, cutaway view of the bag of FIG. 7.

A typical handbag or purse 102 typically includes a bottom surface 5, one or more sidewalls 10, and an open top 11 in communication with an interior storage chamber 15. The present invention relates to an absorbent liner 100 for a handbag 102 or similar storage bag that collects and absorbs fluids leaking from a stored fluid source 106. As depicted in FIG. 3, preferably multiple liners are packaged within a carton 108 or container 122 to facilitate replacement. The liner 100 comprises a base layer 118 having an upper surface, a lower surface, and a plurality of foldable peripheral edges 110 that can be formed into fluid retaining walls as depicted in FIG. 5. The foldable side edges 110 also allow a user 104 to conform the retaining walls to the sidewalls 10 of a desired bag to form a barrier that contains errant fluids 106. Furthermore, the foldable side edges 110 can be easily trimmed to fit the base layer within a desired bag. The base layer 118 is preferably constructed with an air-permeable polyethylene plastic film or similar equivalent that is breathable but impenetrable to fluids. The bottom surface of the base layer is coated with a repositionable adhesive 120 for detachably securing the base layer 118 to the bottom surface 5 of the bag.

Positioned atop the base layer 118 is an absorbent core 116 including a thin layer of air-laid paper that is infused with a superabsorbent polymer matrix to surround and contain liquid. The polymers are designed to retain significantly more moisture than their weight. The core 116 is preferably treated with a silver-ion antimicrobial, disinfectant material for eradicating bacteria. The core 116 could also be treated with a scented material, such as lavender. Furthermore, the core can include an odor-absorbing material, such as hydoxypropyl beta-cyclodextrin, which binds volatile hydrocarbons within its structural ring to contain odorous compounds.

A third wicking layer 114 is constructed with a film of non-woven polymers that rapidly direct fluids to the absorbent core 116. The wicking layer also prevents the superabsorbent polymers from migrating to the inner surfaces of the bag.

A top layer 112 includes a film of non-woven polymers that allows for decoration but allows fluid to quickly flow to the wicking layer. The top layer 112 could be inkjet printed and UV cured to aesthetically enhance the liner. The top layer also provides a bonding area for the repositionable adhesive when multiple liners are stacked for packing, storage, or placement within a desired storage bag.

Figure 4:
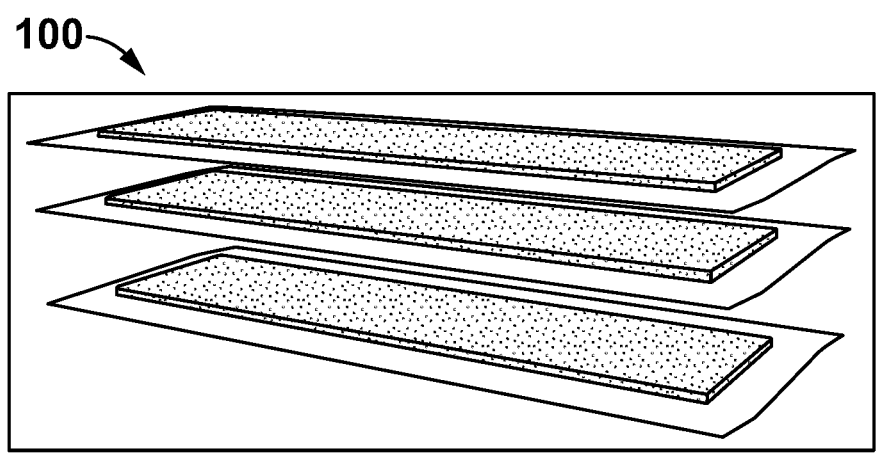
FIG. 4 depicts a stack of multiple liners.
Figure 9:
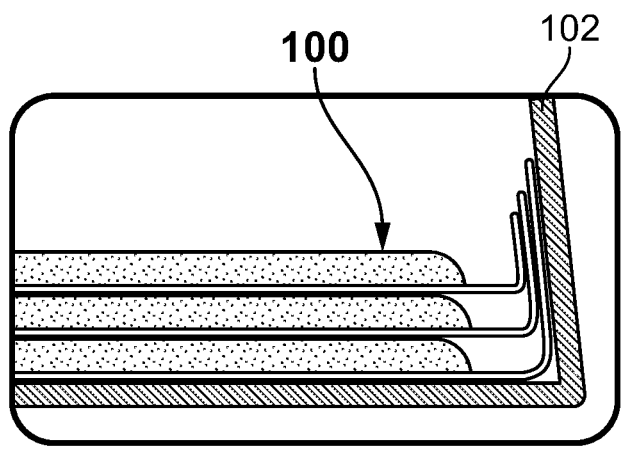
FIG. 9 is sectional view of a stack of liners installed within a handbag.
Figure 10:
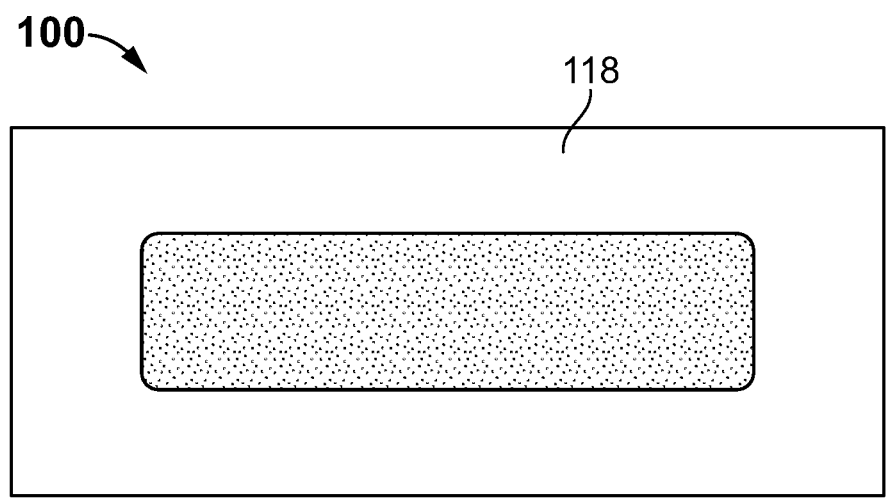
FIG. 10 shows a top view of the liner in one embodiment of the present invention.
Figure 11:
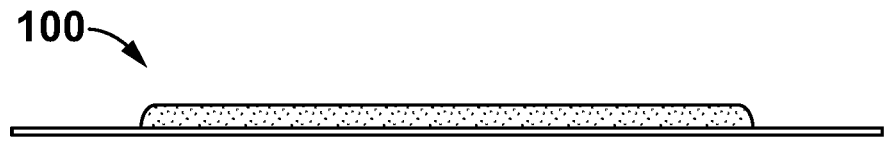
FIG. 11 is a side view of an exemplary liner.
Figure 12:
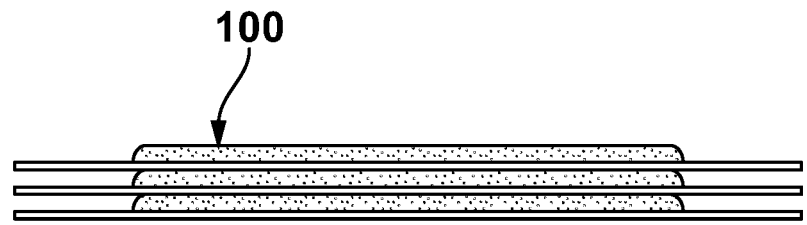
FIG. 12 is an isolated view of a stack of liners for placing within a desired storage bag.
Figure 13:
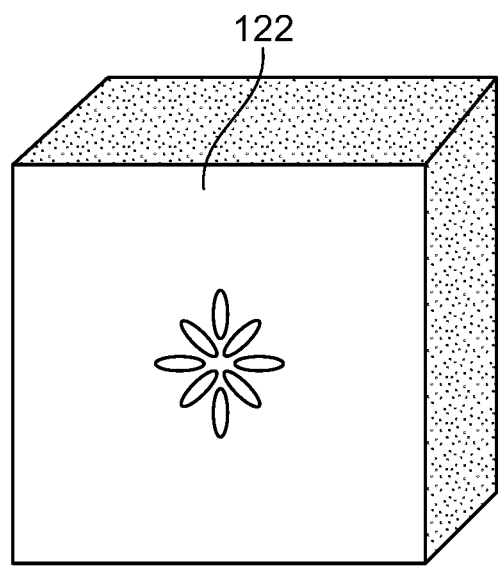
FIG. 13 depicts exemplary packaging for multiple liners according to the present invention.

Preferably, multiple liners are supplied in a unitary pack of 3 or more as depicted in FIGS. 4 and 9 that is secured to the bottom wall of the storage bag. If a spill occurs, a user empties the bag and removes the uppermost liner thereby exposing the underlying liner for subsequent use.

The above-described device is not limited to the exact details of construction and enumeration of parts provided herein. Although the device has been primarily depicted and described as being placed in a handbag or purse, the liner could also be positioned within a variety of personal storage bags, such as but not limited to, backpacks, fanny packs, diaper bags, gym bags, duffle bags and similar items. Furthermore, the size, shape and materials of construction of the various components can be varied without departing from the spirit of the present invention.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

What is claimed is:

1. A storage bag having a bottom surface, at least one outer wall and an opening in communication with an interior storage chamber, and an absorbent liner, wherein the absorbent liner comprises:
   a base layer formed of a water impermeable material;
   a core resting on said base layer, said core constructed with a liquid absorbing material;
   a wicking layer positioned atop said core;
   means for releasably fastening the base layer to the bottom surface of said storage bag.

2. The storage bag according to claim 1 wherein said base layer includes a plurality of peripheral retaining walls.

3. The storage bag according to claim 1 wherein said means for releasably fastening the base layer to the bottom surface of said storage bag comprises said base layer having a lower surface with a repositionable adhesive thereon.

4. The storage bag according to claim 1 wherein the base layer is constructed with an air-permeable, liquid-impenetrable polyethylene plastic film.

5. The storage bag according to claim 1 wherein said absorbent core includes a layer of air-laid paper infused with a superabsorbent polymer matrix to surround and contain liquid.

6. The storage bag according to claim 1 wherein said core is treated with a silver-ion antimicrobial, disinfectant material for eradicating bacteria.

7. The storage bag according to claim 6 wherein said core is treated with a scented material.

8. The storage bag according to claim 7 wherein said core includes an odor-absorbing material.

9. The storage bag according to claim 8 wherein said odor-absorbing material is hydroxypropyl beta-cyclodextrin which binds volatile hydrocarbons within a structural ring to contain odorous compounds.

10. The storage bag according to claim 1 wherein said wicking layer is constructed with a film of non-woven polymers that direct fluids to the absorbent core.

11. The storage bag according to claim 1 further comprising a top layer positioned atop said wicking layer, said top layer including a film of non-woven polymers that allows for decoration while allowing fluid to quickly flow to the wicking layer.

12. The storage bag according to claim 11 wherein said top layer is inkjet printed and UV cured to aesthetically enhance the liner.

* * * * *